Jan. 16, 1968   B. E. TOSSMAN ET AL   3,363,856
EDDY CURRENT NUTATION DAMPER
Filed Sept. 28, 1966
FIG. 1.
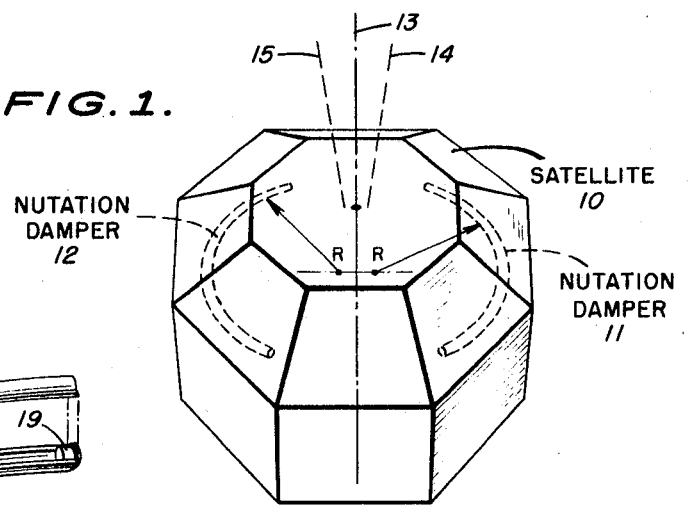
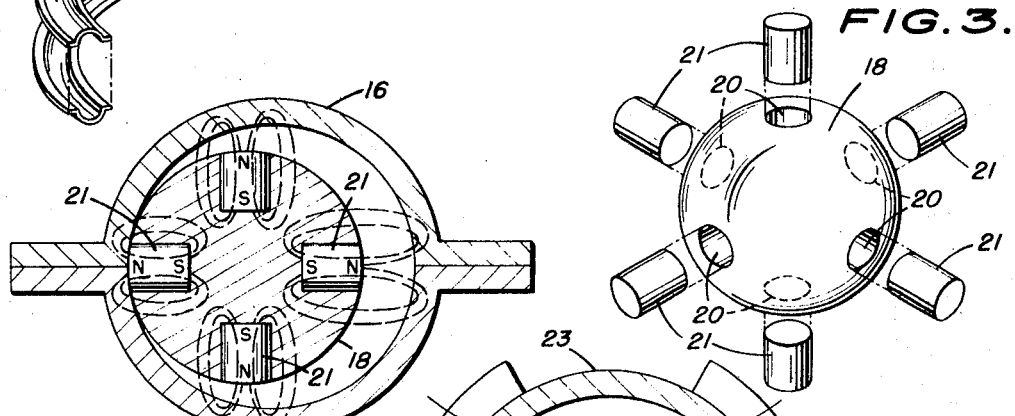
FIG. 2.
FIG. 3.
FIG. 4.
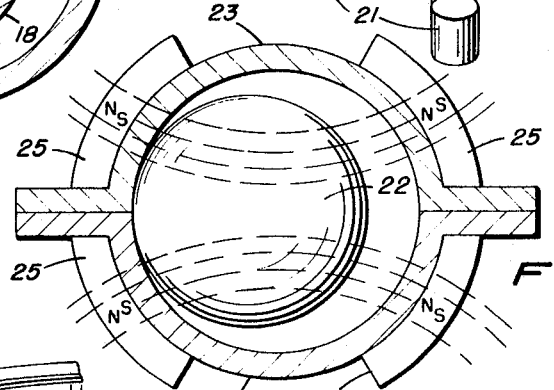
FIG. 6.
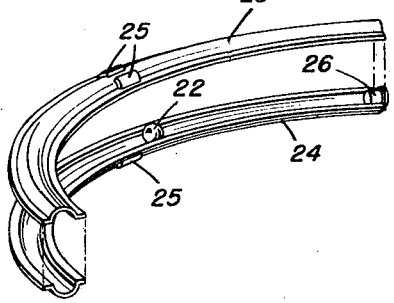
FIG. 5.
BARRY E. TOSSMAN
FREDERICK F. MOBLEY
ROBERT E. FISCHELL
INVENTORS
BY  *J. O. Trusanosky*
ATTORNEY

3,363,856
EDDY CURRENT NUTATION DAMPER

Barry E. Tossman, Frederick F. Mobley, and Robert E. Fischell, Silver Spring, Md., assignors to the United States of America as represented by the Secretary of the Navy
Filed Sept. 28, 1966, Ser. No. 583,128
9 Claims. (Cl. 244—1)

Generally speaking, the present invention relates to energy dissipating systems and more particularly, it pertains to a nutation damping system particularly adapted for use on spin-stabilized spacecraft.

It has been observed that spin-stabilized satellites, for example, inherently undergo undesirable nutations or wobbling when place in orbit. If these nutations are not dissipated, the satellite's attitude will continually vary and thereby detract from satellite performance.

With this in mind, it is generally proposed in accordance with the present invention to provide a simple nutation damping system which can effectively dissipate the nutation energy of such a spacecraft. Moreover, it is proposed to accomplish such damping by making use of the well-known eddy current phenomenon, but, without requiring the use of any external electric power source on the spacecraft; i.e., the system of the present invention is completely passive.

More specifically, the nutation damper of the present invention comprises a pair of arcuate tube members which are affixed on the satellite, for example, in a plane normal to the desired satellite spin axis. The centers of curvature of the arcuate tube members are colinear with, but displaced diametrically opposite one another on either side of, the satellite spin axis. Each tube member contains a ball member that is freely rollable therein.

If the spacecraft is not spinning about the desired spin axis, then the body is said to nutate and these undesirable motions cause the ball members to roll within the arcuate tube members. In accordance with the present invention, either the tube members or the ball members (but not both) are permanently magnetized; whereas, the other members are constructed of electricaly conductive, non-magnetic material such as aluminum. Consequently, any motion of the ball members within the tubular members causes eddy currents to be generated within the electrically conductive, non-magnetic members. The resulting eddy current reaction between ball and tube members then dissipates the energy of the moving ball members and thus gradually diminishes the satellite nutations. As the wobble or nutation angle of the satellite approaches zero, the ball members will inherently stabilize at the center of the respective tube members.

In view of the foregoing, a general object of the present invention is to provide a passive nutation damping system for a spin-stabilized spacecraft.

Another object of the present invention is to provide a nutation damper for spin-stabilized spacecraft comprising a pair of arcuate tube members affixed to the spacecraft and each including a ball member which is free to roll therein, said ball and tube members being constructed such that the undesirable nutation energy of the spacecraft is dissipated by an eddy current reaction between the ball and tube members.

Other objects, purposes and characteristic features of the present invention will in part be pointed out as the description of the invention progresses and in part be obvious from the accompanying drawings wherein:

FIG. 1 is a pictorial illustration of a spin-stabilized satellite equipped with the nutation damping system of the present invention;

FIG. 2 illustrates one embodiment of the present invention wherein the tubular member is constructed of electrically conductive, non-magnetic material and the ball member contained therein is permanently magnetized;

FIG. 3 represents one manner of permanently magnetizing the ball member employed in the embodiment shown in FIG. 2;

FIG. 4 is a cross-sectional view of the magnetized ball embodiment of FIG. 2;

FIG. 5 illustrates a second embodiment of the present invention wherein the ball member is constructed of electrically conductive, non-magnetic material and the tubular member is permanently magnetized; and FIG. 6 is a cross-sectional view of the magnetized tube embodiment shown in FIG. 5.

In FIG. 1 of the drawings, a spin-stabilized satellite 10 is shown having mounted thereon a pair of tube-like nutation dampers 11 and 12 constructed in accordance with the teachings of the present invention. As previously mentioned, the arcuate nutation damper structures 11 and 12 are disposed diametrically opposite one another on either side of the spin axis 13, in a plane normal thereto, with the centers of curvature R of the nutation dampers colinear with the spin axis 13. The nutation dampers 11 and 12 operate in a manner to be described in detail hereinafter, such that eddy current reactions are set up within the dampers 11 and 12 effective to dissipate the nutation energy of the satellite 10, as it wobbles or nutates between the positions shown by the dotted lines 14 and 15 in FIG. 1.

FIG. 2 of the accompanying drawings illustrates one embodiment of the ball-in-tube nutation damper provided by the present invention, wherein the tubular member is formed of electrically conductive, non-magnetic material, such as aluminum, and the ball member is permanently magnetized. More specifically, each tube member is formed of tube halves 16 and 17 adapted to be affixed to one another by any suitable means, such as by screws, and wherein a permanently magnetized ball 18 is free to roll. When the tube halves 16 and 17 are mated together, the ends of the tube-like member formed thereby are fitted with suitable plug members, one of which is illustrated in FIG. 2 and designated by the reference numeral 19.

The permanently magnetized ball 18 shown in FIG. 2 is preferably constructed as shown in detail in FIG. 3. More specifically, the body of the ball 18 might be bronze and is formed with six radially extending bores 20, arranged such that one pair of bores 20 extend in alignment along each of three mutually perpendicular diameters of the ball member 18. Each of these bores or recesses 20 is adapted to receive a small cylindrical permanent magnet 21 bonded therein, with a like magnetic pole of each magnet extending in the same direction relative to the ball member 18. This arrangement of the magnets 21 produces relatively high value near magnetic fields about the ball member 18, while at the same time causing the net magnetic dipole moment of the ball 18 to be substantially zero.

Referring now to the transverse, cross-sectional view of FIG. 4, the small permanent magnets 21 which are bonded into the ball member 18, create magnetic fields about the ball 18 substantially as shown in FIG. 4. These magnetic fields produced by the ball member 18 extend into the tubular member formed by the tube halves 16 and 17, so that when the satellite 10 nutates and each ball 18 rolls within its electrically conductive tubular member 16–17, eddy currents are established within the tubular members effective to dissipate, as heat, the nutation energy of the satellite 10. This eddy current reaction thus gradually damps out these nutations and causes the satellite to stop wobbling about its spin axis 13, as desired. As previously mentioned, when this occurs, each ball 18 will inherently stabilize at the center of the associated tube member 16–17 because of the manner in which the centers of tube curvature are disposed relative to the spin axis 13.

A second embodiment of the present invention is illustrated in FIGS. 5 and 6 of the accompanying drawings. More specifically, in this second embodiment, the ball member 22 is preferably made of pure copper, ground and polished. The tube halves 23 and 24 are then made of aluminum and have four permanent magnets 25 affixed thereto in an arrangement which can best be seen in FIG. 6. These permanent magnets 25 set up magnetic fields substantially as shown by the dotted lines in FIG. 6 which extend transversely through the copper ball member 22 and cause eddy currents to be set up within the ball member 22, effective to dissipate the nutation energy of the satellite, when the ball member 22 rolls within the tubular member 23–24. The ends of this tubular member are fitted with suitable plugs, such as that designated at 26 in FIG. 5.

From the foregoing discussion, it will be seen that a simple, yet effective nutation damping system has been provided in accordance with the present invention, capable of damping out the nutations of a spin-stabilized satellite or spacecraft about its spin axis. Moreover, the nutation damper of the present invention is completely passive, i.e., it does not require any external electric power source.

Obviously, many modifications and variations of the present invention are possible in the light of the above teachings. It should therefore be understood that within the scope of the appended claims, the invention may be practiced otherwise than as specifically described.

What is claimed is:

1. In a spacecraft, a nutation damping system comprising,
   a pair of arcuate hollow tube members affixed to said spacecraft in a plane normal to a selected axis of said spacecraft and being diametrically opposite each other about said axis, and
   a pair of movable members, one of which is disposed within each of said hollow tube members and being movable therein when said spacecraft nutates about said axis,
   certain of said movable members and tube members being permanently magnetized and the others of said movable members and tube members being constructed of electrically conductive, non-magnetic material, whereby motion of said movable members within said tube members causes the generation of eddy currents in the conductive ones of said movable members and tube members effective to dissipate the nutation energy of said spacecraft.

2. The system specified in claim 1 wherein each of said movable members is a ball member which is free to roll longitudinally within one of said tube members.

3. The nutation damping system specified in claim 2 wherein at least one of said ball members is constructed of electrically conductive, non-magnetic material and the tube member containing such non-magnetic ball member is permanently magnetized.

4. The system specified in claim 3 wherein said permanently magnetized tube member has at least one permanent magnet affixed thereto effective to establish a permanent magnetic field extending transversely across said tube member.

5. The nutation damping system specified in claim 2 wherein at least one of said tube members in constructed of electrically conductive, non-magnetic material and the ball member disposed within said non-magnetic tube member is permanently magnetized.

6. The system specified in claim 5 wherein said permanently magnetized ball member has at least one permanent magnet affixed thereto for permanently magnetizing said magnetic ball member.

7. The system specified in claim 6 wherein
   each ball member is formed with a pair of diametrically proposed recesses arranged in alignment with each of three mutually perpendicular diameters of said ball member, and wherein
   a permanent magnet is secured within each of said recesses with a like pole of each permanent magnet extending radially outward from the center of said ball member, whereby the near magnetic fields adjacent said ball member are relatively large, while the total dipole moment of said ball member is substantially zero.

8. The system specified in claim 1 wherein said spacecraft is a spin-stabilized satellite and said selected axis is the spin axis of said satellite.

9. The system specified in claim 8 wherein the centers of curvature of said arcuate tube members are colinear with, but disposed on diametrically opposite sides of said satellite spin axis, such that said movable members will inherently stabilize at the centers of said tube members when said spin-stabilized satellite ceases to nutate about said spin axis.

References Cited

UNITED STATES PATENTS

| | | | |
|---|---|---|---|
| 2,669,325 | 2/1954 | Raines | 188—1 |
| 3,034,745 | 5/1962 | Stewart | 244—1 |
| 3,168,263 | 2/1965 | Kamm | 244—1 |
| 3,282,532 | 11/1966 | Tinling et al. | 244—1 |

FERGUS. S. MIDDLETON, *Primary Examiner.*